(12) United States Patent
Ito et al.

(10) Patent No.: US 12,332,636 B2
(45) Date of Patent: *Jun. 17, 2025

(54) PRODUCTION FACILITIES MONITORING METHOD, PRODUCTION FACILITIES MONITORING DEVICE, AND OPERATION METHOD FOR PRODUCTION FACILITIES (71) Applicant: JFE Steel Corporation, Tokyo (JP)

(72) Inventors: Tomohiko Ito, Tokyo (JP); Kazuhira Ichikawa, Tokyo (JP); Tetsuya Yamamoto, Tokyo (JP); Shingo Sugioka, Tokyo (JP); Hiroyuki Shimamoto, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 313 days.

This patent is subject to a terminal disclaimer.

(21) Appl. No.: 17/774,551

(22) PCT Filed: Nov. 2, 2020

(86) PCT No.: PCT/JP2020/041116
§ 371 (c)(1),
(2) Date: May 5, 2022

(87) PCT Pub. No.: WO2021/095594
PCT Pub. Date: May 20, 2021

(65) Prior Publication Data
US 2022/0390928 A1 Dec. 8, 2022

(30) Foreign Application Priority Data

Nov. 13, 2019 (JP) ................. 2019-205340

(51) Int. Cl.
G05B 19/418 (2006.01)
C21B 5/00 (2006.01)
(Continued)

(52) U.S. Cl.
CPC ............ *G05B 19/4184* (2013.01); *C21B 5/00* (2013.01); *C21B 7/24* (2013.01); *G05B 23/0237* (2013.01); *G05B 23/0267* (2013.01)

(58) Field of Classification Search
CPC .................................................. G05B 19/4184
See application file for complete search history.

(56) References Cited

U.S. PATENT DOCUMENTS 8,352,197 B2   1/2013   Rantala et al.
9,274,520 B2   3/2016   Ali et al.
(Continued)

FOREIGN PATENT DOCUMENTS

CN   106933205 A   7/2017
CN   107921639 A   4/2018
(Continued)

OTHER PUBLICATIONS

International Search Report and Written Opinion for International Application PCT/JP2020/041116, dated Dec. 28, 2020, 6 pages.
(Continued)

Primary Examiner — Suresh Suryawanshi
(74) Attorney, Agent, or Firm — Buchanan Ingersoll & Rooney PC (57) ABSTRACT A production facilities monitoring method monitors an operation status of a plurality of production facilities of a same kind located at a plurality of production sites and includes: a data information preparation step of aggregating operational data of each of the production facilities for each of the production sites; a data accumulation step of accumulating the operational data aggregated at the data information preparation step into a computer located at a data accumulation site; a data analysis step of analyzing a current operation status at each of the production facilities, using current operational data and past operational data accumu-
(Continued)

lated at the data accumulation step; and an operation status determination step of determining whether operation is abnormal at each of the production facilities, based on an analysis result of the data analysis step.

10 Claims, 3 Drawing Sheets

(51) Int. Cl.
  *C21B 7/24* (2006.01)
  *G05B 23/02* (2006.01)

(56) References Cited

U.S. PATENT DOCUMENTS

| | | |
|---|---|---|
| 10,386,827 B2 | 8/2019 | Enver et al. |
| 10,806,534 B2 | 10/2020 | Hashimoto et al. |
| 2002/0040251 A1 | 4/2002 | Ogushi et al. |
| 2004/0158474 A1 | 8/2004 | Karschnia et al. |
| 2011/0054802 A1 | 3/2011 | Rantala et al. |
| 2015/0077263 A1 | 3/2015 | Ali et al. |
| 2017/0102694 A1 | 4/2017 | Enver et al. |
| 2017/0139398 A1* | 5/2017 | Tsuzuki ............. G05B 23/0235 |
| 2017/0351226 A1 | 12/2017 | Bliss et al. |
| 2018/0052451 A1 | 2/2018 | Billi-Duran et al. |
| 2018/0052903 A1 | 2/2018 | Mercado et al. |
| 2018/0081344 A1 | 3/2018 | Romatier et al. |
| 2018/0137277 A1 | 5/2018 | Mestha et al. |
| 2018/0203439 A1* | 7/2018 | Hattori ................. G06F 17/18 |
| 2018/0224834 A1 | 8/2018 | Rischar et al. |
| 2018/0231969 A1 | 8/2018 | Noda et al. |
| 2018/0243916 A1 | 8/2018 | Hashimoto et al. |
| 2018/0357334 A1 | 12/2018 | Chao et al. |
| 2018/0372583 A1 | 12/2018 | Tezuka et al. |
| 2019/0129675 A1 | 5/2019 | Ochiai |
| 2019/0146423 A1 | 5/2019 | Salsbury et al. |
| 2019/0278259 A1* | 9/2019 | Tsuzuki ............. G05B 19/4183 |
| 2019/0369607 A1 | 12/2019 | Enver et al. |
| 2020/0004230 A1 | 1/2020 | Ankermann et al. |
| 2020/0068759 A1 | 2/2020 | Cvijetinovic et al. |
| 2020/0201309 A1* | 6/2020 | Maruyama ....... G05B 19/41875 |
| 2020/0264595 A1 | 8/2020 | Shibata et al. |
| 2021/0232131 A1 | 7/2021 | Imanari et al. |
| 2022/0091590 A1 | 3/2022 | Hanada |
| 2022/0390928 A1 | 12/2022 | Ito et al. |

FOREIGN PATENT DOCUMENTS

| | | | |
|---|---|---|---|
| EA | 023264 B1 | | 5/2016 |
| JP | 2003005816 A | * | 1/2003 |
| JP | 2004240513 A | * | 8/2004 |
| JP | 2004334492 A | | 11/2004 |
| JP | 2004341822 A | * | 12/2004 |
| JP | 2005018282 A | | 1/2005 |
| JP | 2006139514 A | * | 6/2006 ............ G05B 15/02 |
| JP | 2008305259 A | * | 12/2008 |
| JP | 2012022612 A | * | 2/2012 |
| JP | 2015170055 A | | 9/2015 |
| JP | WO2014038082 A1 | * | 8/2016 |
| JP | 2016189166 A | | 11/2016 |
| JP | 2017128805 A | | 7/2017 |
| JP | 2018132786 A | | 8/2018 |
| KR | 20170114141 A | * | 10/2017 |
| KR | 20180026495 A | | 3/2018 |
| RU | 2126056 C1 | | 2/1999 |
| RU | 2636095 C2 | | 11/2017 |
| WO | 2016033247 A2 | | 3/2016 |
| WO | 2018145947 A1 | | 8/2018 |
| WO | 2021095594 A1 | | 5/2021 |

OTHER PUBLICATIONS

Korean Office Action for Korean Application No. 10-2022-7014502, dated May 11, 2024 with Concise Statement of Relevance of Office Action. (6 pages).
Communication pursuant to Article 94(3) EPC dated Oct. 10, 2023, issued in the corresponding European Patent Application No. 20887724.1, 6 pages.
Communication pursuant to Article 94(3) EPC dated May 13, 2024, issued in the corresponding European Patent Application No. 20887724.1, 5 pages.
Extended European Search Report dated Nov. 21, 2022, issued in the corresponding European patent Application No. 20887724.1, 12 pages.
International Search Report and Written Opinion for International Application No. PCT/JP2020/041117, dated Dec. 28, 2020, 11 pages including 5 pages of English Translation.
Korean Office Action for Korean Application No. 10-2022-7014616, issued May 11, 2024 with Concise Statement of Relevance of Office Action, 6 pages.
Non-Final Office Action issued by the U.S. Patent and Trademark Office in U.S. Appl. No. 17/774,546, mailed Jun. 22, 2024, U.S. Patent and Trademark Office, Alexandria, VA, 31 pages.
Russian Office Action for Russian Application No. 2022115478, dated Jan. 3, 2023, 14 pages including 7 pages of English Translation.
Roshchina, et al., "Operation, Repair and Maintenance of Building and Constructions", Training Manual, Vladimir Publishing House of Vladimir State University with an English abstract, 2005, 109 pages.
European Communication Pursuant to Article 94(3) for Application No. 20887024.6, dated Oct. 17, 2023, 5 pages.
Roshchina, S.I., et al., "Operation, Repair and Maintenance of Buildings and Constructions," Training Manual, Vladimir, Publishing House of Vladimir State University, 2005, 109 pages (with English introduction).
Russian Office Action for Russian Application No. 2022112691, dated Jan. 12, 2023 with translation, 12 pages.
Extended European Search Report for European Application No. 20887024.6, dated Nov. 21, 2022, 9 pages.
Chinese Office Action with Search Report for Chinese Application No. 202080078599.4, dated Mar. 1, 2023, 11 pages.
Qu, "Research on Asymmetric Information in the Auto Insurance market", China Fortune Press, 1st edition, 1st print, (Jul. 2018), p. 10, with an English translation. (2 pages).
Office Action issued Apr. 28, 2025, by the State Intellectual Property Office of People's Republic of China in corresponding Chinese Patent Application No. 202080078599.4 and an English machine translation with Concise Statement of Relevance of the Office Action. (16 pages).

* cited by examiner

FIG.2

PRODUCTION FACILITIES MONITORING METHOD, PRODUCTION FACILITIES MONITORING DEVICE, AND OPERATION METHOD FOR PRODUCTION FACILITIES

CROSS REFERENCE TO RELATED APPLICATIONS

This is the U.S. National Phase application of PCT/JP2020/041116, filed Nov. 2, 2020, which claims priority to Japanese Patent Application No. 2019-205340, filed Nov. 13, 2019, the disclosures of these applications being incorporated herein by reference in their entireties for all purposes.

FIELD OF THE INVENTION

The present invention relates to a production facilities monitoring method for monitoring the operation status of a plurality of production facilities of the same kind located at a plurality of production sites, a production facilities monitoring device, and an operation method for production facilities.

BACKGROUND OF THE INVENTION

In the manufacturing industry that requires a large number of large-scale production facilities to produce products, consolidating production facilities into a single location would require a huge site and involve the risk of operation completely stopping in the case of a major disaster such as an earthquake, so production sites are often distributed across the country or sometimes overseas. In this case, a production plan is made at each production site, and the production facility is operated according to the production plan.

In the iron industry, steelworks are often located at multiple places. Among steelworks, in integrated steelworks in which production facilities for upstream processes to downstream processes are integrated, production facilities such as a blast furnace for producing an iron source, a converter for adjusting the components of molten iron produced in the blast furnace, a continuous casting facility for solidifying the molten iron into plate slabs, and a hot-rolling facility for stretching the slabs into thinner plates are often installed in common in the steelworks. Until now, abnormality determination in the operation of these production facilities has been performed for each production facility at each production site, and each production facility individually addresses the abnormality.

Typically, production facilities are operated by operation operators checking operational data. When it is determined that the operation is abnormal, the operating conditions are changed to prevent the abnormality from spreading, thereby stabilizing the facility operation. Abnormality detection technology in blast furnaces is described in Patent Literature 1, for example.

Specifically, the value of the Q statistic, which represents the second and subsequent components obtained by performing principal component analysis of data from pressure gauges installed in the shaft of the furnace body of a blast furnace, increases as the shaft pressure fluctuates with impaired ventilation of the blast furnace. According to the technology described in Patent Literature 1, a threshold is set for the Q statistics in normal conditions collected in advance, and when the Q statistic exceeds the threshold value, it is determined that an operational abnormality has occurred in the blast furnace.

PATENT LITERATURE

Patent Literature 1: Japanese Patent Application Laid-open No. 2017-128805

SUMMARY OF THE INVENTION

In recent years, the number of operation operators has been decreasing in the background of workforce reduction due to business streamlining and a decline in the domestic working population. Essentially, when an operation abnormality occurs, it is necessary to temporarily stop the operation and then promptly take necessary action to eliminate the trouble. However, with fewer operation operators, much work associated with the operation is concentrated on the few operation operators. In addition, in such operation by fewer operators, operational expertise in the event of abnormalities is not passed down smoothly, and continuing the operation without awareness of the abnormal situation in production facilities may lead to even bigger troubles, resulting in long shutdowns and large costs for recovery. Moreover, this situation makes product manufacturing difficult and leads to a decrease in sales of products. In light of this background, abnormality detection technologies as described above are being developed for various processes. However, it is important that these abnormality detection technologies should be operated reliably and reflected in the operation to prevent serious facility troubles.

Aspects of the present invention are made in view of the problem above and an object according to aspects of the present invention is to provide a production facilities monitoring method, a production facilities monitoring device, and an operation method for production facilities that accurately detect operational abnormalities in production facilities without requiring a large amount of manpower and enable prompt action for operational abnormalities.

A production facilities monitoring method according to aspects of the present invention for monitoring an operation status of a plurality of production facilities of a same kind located at a plurality of production sites includes: a data information preparation step of aggregating operational data of each of the production facilities for each of the production sites; a data accumulation step of accumulating the operational data aggregated at the data information preparation step into a computer located at a data accumulation site; a data analysis step of analyzing a current operation status at each of the production facilities, using current operational data and past operational data accumulated at the data accumulation step; and an operation status determination step of determining whether operation is abnormal at each of the production facilities, based on an analysis result of the data analysis step.

The number of items, item names and units of the operational data may be common among the production facilities.

The operation status determination step may include a step of determining whether the operation is abnormal in each of the production facilities, based on an index derived from the operational data at the data analysis step.

The data information preparation step may include a step of aggregating metadata including at least operating condition data of each of the production facilities at a time when the operational data is obtained, the data accumulation step may include a step of accumulating metadata aggregated at the data information preparation step into the computer, the data analysis step may include a step of extracting a period in which a past operating condition undergoes a change similar to a change for a predetermined period of time under a current operating condition by comparing metadata obtained from current operation with past metadata including metadata obtained at other production facilities, and the operation status determination step may include a step of determining whether the operation at each of the production facilities is abnormal by comparing the current operational data in the period extracted at the data analysis step with the past operational data.

The operation status determination step may include a step of determining whether the operation is abnormal, using an operation indicator, operational data and at least one pieces of metadata of operating conditions converted into a same scale.

The production facilities monitoring method may include a step of displaying aggregated operational data and an analysis result of the operational data.

A production facilities monitoring device according to aspects of the present invention monitors an operation status of a plurality of production facilities of a same kind located at a plurality of production sites, and includes: a data information preparation unit configured to aggregate operational data of each of the production facilities for each of the production sites; a data accumulation unit configured to accumulate the operational data aggregated by the data information preparation unit; a data analysis unit configured to analyze a current operation status at each of the production facilities, using current operational data and past operational data accumulated by the data accumulation unit; and an operation status determination unit configured to determine whether the operation is abnormal at each of the production facilities, based on an analysis result by the data analysis unit.

An operation method for production facilities according to aspects of the present invention uses the production facilities monitoring method according to aspects of the present invention and includes a step of operating a production facility based on a determination result at the operation status determination step.

The production facilities monitoring method, the production facilities monitoring device, and the operation method for production facilities according to aspects of the present invention can accurately detect operational abnormalities in production facilities without requiring a large amount of manpower and enable prompt action for operational abnormalities.

DETAILED DESCRIPTION OF EMBODIMENTS OF THE INVENTION

Steelworks mainly include upstream process facilities that manufacture slabs serving as a source of products, downstream process facilities that manufacture final products, and energy facilities that circulate electricity, fuel gas, water, and the like. The upstream process facilities include production facilities such as a raw material yard for storing raw iron ore and other materials, a coke oven for producing coke from coal, a sintering plant for sintering fine iron ore, a blast furnace for producing molten iron by burning these raw materials at high temperatures, a torpedo car for transporting molten iron and a railroad facility for transporting the torpedo car, a pretreatment facility for adjusting components of molten iron, a converter for producing molten steel by adjusting the amount of carbon in molten iron, a furnace for secondary refining, and a continuous casting facility for solidifying molten steel into final slabs.

The downstream process facilities include production facilities such as a hot-rolling facility for producing thin steel strips by heating slabs, a cold-rolling facility for producing thin, stretched steel sheets with specified strength by repeatedly heating and cooling steel strips, a plating facility for plating the steel sheets produced in the cold-rolling process, a tube-making facility for producing tubes by bending the steel sheets produced in the hot-rolling process and welding the sheet ends together, and a shape making facility for producing product lineups called shapes for building materials.

The energy facilities include production facilities such as a facility for refining gas obtained from the blast furnace and coke, a power generation facility for power generation using the refined gas, gas pipes for transporting the gas to the power generation facility, and water pipes for transporting water to cool various furnaces and heated products.

Since there are so many production facilities and each requires a large site for installation, the integrated steelworks including upstream process facilities and downstream process facilities require a vast site area. The production volume of steel products in a single steelworks does not satisfy the demand, so it is necessary to manufacture steel products at a plurality of steelworks. In such a case, steelworks are sometimes situated in the neighborhood of users that require a large volume of steel products in order to facilitate supply of products to the users of steel products, or steel products are manufactured in steelworks situated at a plurality of production sites in order to avoid shutdowns due to large-scale disasters.

Each production facility in the steelworks is equipped with a number of sensors that measure the status of the production facility and sensors that measure the status of steel products produced. In daily operations, the operation operators set the necessary production conditions for steel products based on data measured by these sensors and perform operation. The following description is an example of the operation in a blast furnace in the upstream process facilities.

Typically, in the operation of a blast furnace, the degree of opening of the top bunker is controlled so that raw materials such as iron ore, sintered ore, and coke are charged from the top of the furnace at an appropriate charging rate, and the inclination and the rotation speed of the charging device are set to achieve the intended burden distribution. The raw materials temporarily stored in the top bunker at the top of the furnace are sequentially weighed so that the charge volume is controlled. The surface profile of the charged raw materials is measured by a microwave profilometer, and whether the distribution of the charged raw materials is correct is determined. In the blast furnace, hot air is injected from a plurality of tuyeres disposed circumferentially in the furnace belly. The injected hot air flows to the top of the furnace while exchanging heat with the descending raw materials. When the charged raw materials are distributed as intended, data from a plurality of pressure gauges installed in the furnace body indicates substantially similar behavior. The temperature and the components of the gas reaching the top of the furnace are measured by a sonde installed at the top of the furnace to confirm that the gas flow in the furnace is as intended and the raw materials are chemically reacting normally to yield molten iron.

The flow rate, the temperature, the moisture, the enriched oxygen content, and the like of the hot air injected from the tuyeres are set, and the injection pressure is measured. Furthermore, pulverized coal is injected from the lance installed in the tuyere, and the amount of injection of pulverized coal is set. Cameras for monitoring the status in the furnace are installed at the tuyeres to sequentially capture images in the tuyeres. The temperature of the tuyeres is also measured. Furthermore, a number of thermometers for monitoring the temperature of the furnace body are attached to sequentially measure the temperature. In addition, the quantity and the temperature of cooling water fed to a cooling panel for cooling the furnace body as well as the temperature of the cooling panel is measured. The produced molten iron is discharged to the outside of the furnace through a tap hole at the lower part of the furnace together with slag produced at the same time in the furnace. The time of start of tapping from the tap hole and the time of end of tapping are also recorded. The molten iron and the slag discharged from the tap hole are separated in a metal runner by the difference in specific gravity, and the molten iron is poured into a torpedo car.

The slag flows into a slag treatment facility, is water-cooled or air-cooled, and stored. Immediately after the molten iron is discharged from the blast furnace, the temperature is measured and the amount of silicon contained in the molten iron is also measured. Furthermore, the weight of the molten iron flowing into the torpedo car is measured by a load cell. The basicity and the discharge rate of the slag are also measured. In the case of end-product manufacturing facilities, the production conditions such as the operating speed of each production line, furnace temperature, product heating time, and coating setting weight, product defects and shape obtained from sensors, and any other product characteristic evaluation data are considered to be part of operational data set. The product in the blast furnace can be read as molten iron or slag.

These operating conditions, sensor data, and product information are aggregated into a control computer (called a process computer) that can be monitored by the operation operator, and recorded with a single time stamp (time information). In the process computer in the blast furnace, indices such as permeability index and gas utilization ratio that indicate the state of the blast furnace are calculated based on the recorded data and recorded together with sensor data associated with each facility, measurement data on molten iron and slag, and operating conditions. Blast furnaces in remote areas are operating substantially in the same way, and similar operational data sets are obtained.

Hereinafter, referring to the drawings, a production facilities monitoring system according to an embodiment of the present invention will be described, in which aspects of the present invention are applied to the process of monitoring the operation status of a plurality of blast furnaces located at a plurality of production sites. In the present embodiment, aspects of the present invention are applied to the process of monitoring the operation status of a plurality of blast furnaces located at a plurality of production sites. However, the applicable range of aspects of the present invention is not limited to the present embodiment, and aspects of the present invention can be applied to a wide range of overall processes of monitoring the operation status of a plurality of production facilities of the same kind located at a plurality of production sites.

[Configuration]

Figure 1:
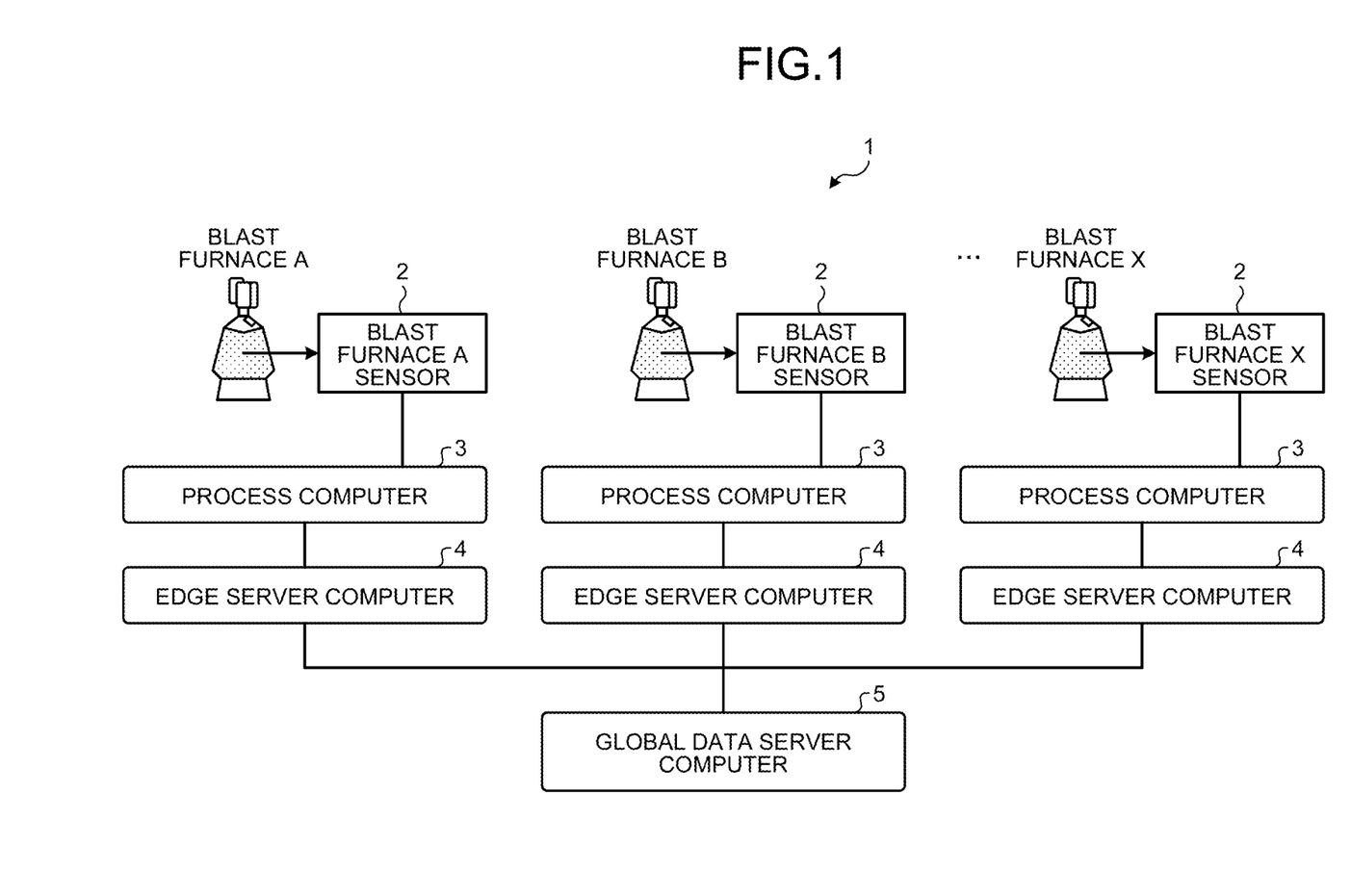
FIG. 1 is a block diagram illustrating a configuration of a production facilities monitoring system according to an embodiment of the present invention.
Figure 2:
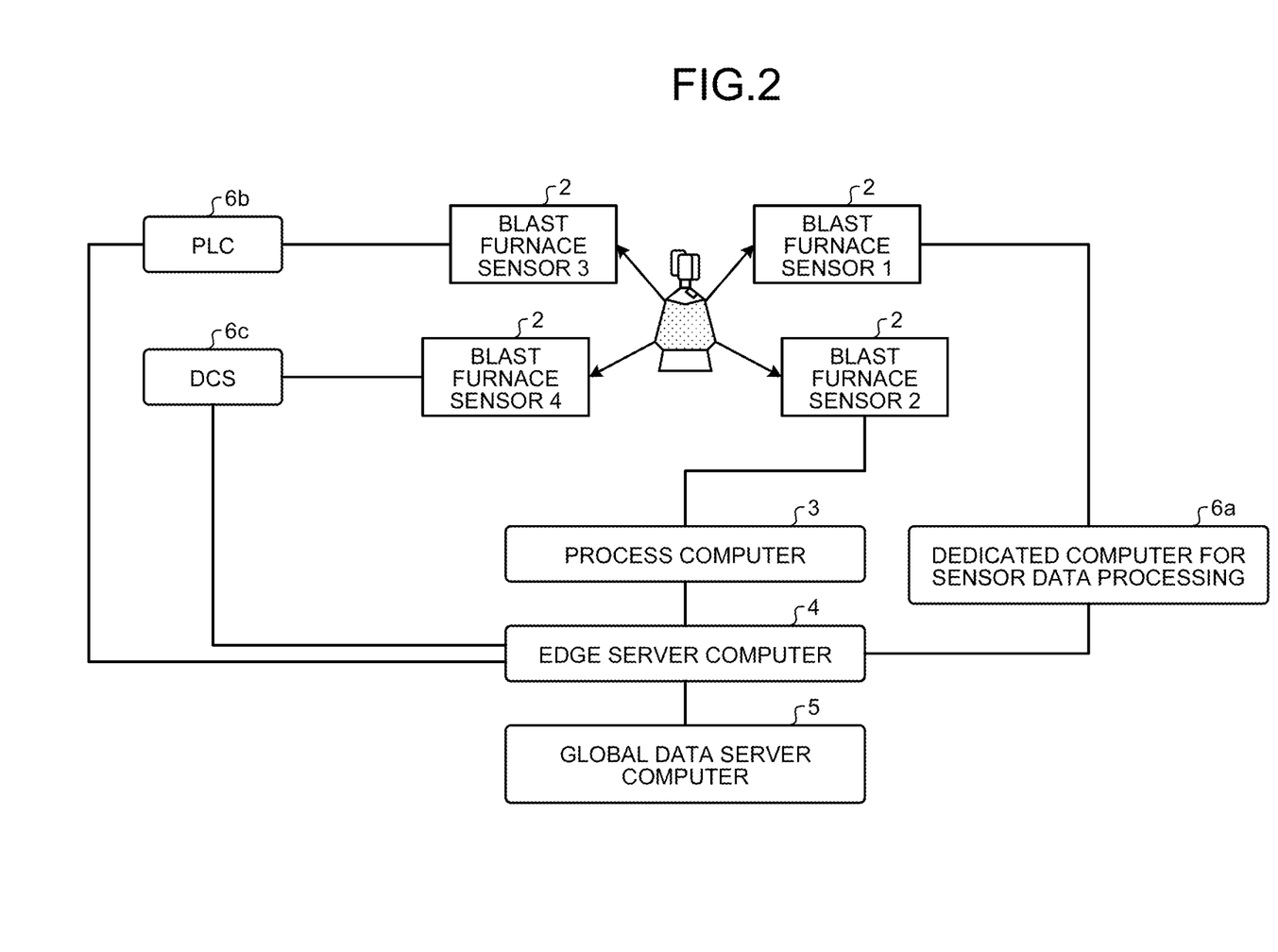
FIG. 2 is a block diagram illustrating a configuration of a modification of the production facilities monitoring system illustrated in FIG. 1.

First, referring to FIG. 1 and FIG. 2, a configuration of the production facilities monitoring system according to an embodiment of the present invention will be described. FIG. 1 is a block diagram illustrating a configuration of the production facilities monitoring system according to an embodiment of the present invention. FIG. 2 is a block diagram illustrating a configuration of a modification of the production facilities monitoring system illustrated in FIG. 1.

As illustrated in FIG. 1, a production facilities monitoring system 1 as an embodiment of the present invention is a system for monitoring the operation status of a plurality of blast furnaces (a blast furnace A to a blast furnace X) located at a plurality of production sites. The system includes blast furnace sensors 2 (a blast furnace A sensor to a blast furnace X sensor) installed at individual blast furnaces and each measuring data indicating the status of the blast furnace and molten iron produced in the blast furnace, process computers 3 for individual production sites, each electrically connected to the corresponding blast furnace sensor 2, edge server computers 4 for individual production sites, each electrically connected to the corresponding process computer 3, and a global data server computer 5 connected to the edge server computers 4 via a telecommunication network.

Here, the process computers 3, the edge server computers 4, and the global data server computer 5 are configured with well-known information processing devices. The global data server computer 5 is located at any production site or at a place other than the production sites. However, the location of the global data server computer 5 (data accumulation site) is not physically limited to a single location and may be divided into multiple locations. As illustrated in FIG. 2, devices such as a dedicated computer 6a for sensor data processing, a programmable logic controller (PLC) 6b, and a distributed control system (DCS) 6c may be connected to the blast furnace sensors 2, and the blast furnace sensors 2 may be electrically connected to the edge server computer 4 through these devices.

The production facilities monitoring system 1 with this configuration performs a facility monitoring process described below and thereby accurately detects operational abnormalities in blast furnaces without requiring a large amount of manpower and enables prompt action for the operational abnormalities in blast furnaces. The operation of the production facilities monitoring system 1 in performing the facility monitoring process will be described below with reference to the flowchart illustrated in FIG. 3.

[Facility Monitoring Process]

Figure 3:
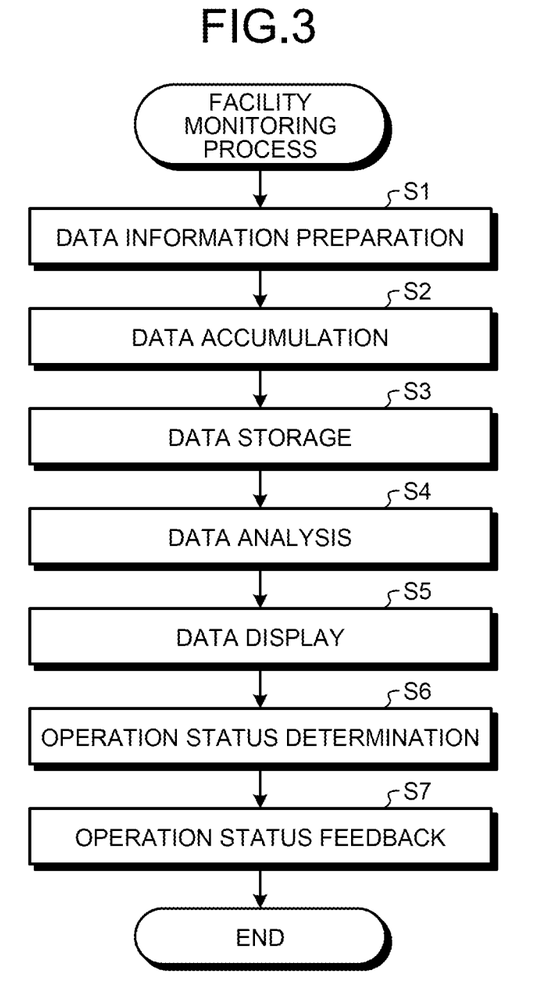
FIG. 3 is a flowchart illustrating a facility monitoring process according to an embodiment of the present invention.

FIG. 3 is a flowchart illustrating the facility monitoring process according to an embodiment of the present invention. The facility monitoring process illustrated in FIG. 3 starts at the timing when the operation of the blast furnace is started, and the facility monitoring process proceeds to step S1.

In the process at step S1, the process computer 3 aggregates operational data sets and transmits the aggregated data sets to the edge server computer 4. The edge server computer 4 stores the operational data sets transmitted from the process computer 3 into a data storage device such as a hard disk, an optical disc, or a USB memory. As used herein, the operational data set refers to operational data of a blast furnace and metadata obtained at the same time. The operational data means data measured by the blast furnace sensor 2 and/or various indices calculated based on the data measured by the blast furnace sensor 2. The metadata means operating condition data of the blast furnace at the time when the operational data was obtained, setting values, operation status, and operational data other than the operational data of interest. It is preferable that the number of items, the item names, and units of operational data and metadata be standardized to be identical among a plurality of production sites.

The process computer 3 is heavily loaded because it performs model calculations, controls various devices, and collects and processes data. In addition, if operational data sets are transmitted to the global data server computer 5 via the telecommunication network, a waiting time may occur depending on a congestion state of the telecommunication network, which may affect the blast furnace operation. In the present embodiment, therefore, the edge server computer 4 is installed at a close distance on the telecommunication network, and the process computer 3 is connected to the edge server computer 4 via the telecommunication network. The operational data sets are temporarily stored in the edge server computer 4, and the global data server computer 5 accumulates the operational data sets stored in the edge server computer 4 via the telecommunication network, as described later. When the production facilities monitoring system 1 is configured as illustrated in FIG. 2, the edge server computer 4 also stores data transmitted from the devices such as the dedicated computer 6a for sensor data processing, the PLC 6b, and the DCS 6c. The process at step S1 is then completed, and the facility monitoring process proceeds to the process at step S2.

In the process at step S2, the global data server computer 5 reads an electronic file containing the operational data sets stored in each edge server computer 4 via the telecommunication network at predetermined time intervals (e.g., every minute when changes in each sensor in the blast furnace are tracked). The edge server computer 4 may transmit an electronic file containing the operational data sets to the global data server computer 5 at predetermined time intervals. The process at step S2 is then completed, and the facility monitoring process proceeds to the process at step S3.

In the process at step S3, the global data server computer 5 stores the operational data sets of each blast furnace read in the process at step S2 into an accumulated data recording device such as a hard disk, an optical disc, or a USB memory. In this case, the global data server computer 5 synchronizes the times of the operational data sets of each blast furnace so that the operational data sets of each blast furnace at the same time can be compared with each other. When the names and units of the data items in the operational data sets vary, the global data server computer 5 converts them into predetermined names and units to standardize the names and the units. The process at step S3 is then completed, and the facility monitoring process proceeds to the process at step S4.

In the process at step S4, the global data server computer 5 analyzes the operation status of the blast furnace by analyzing the operational data sets of the blast furnace stored in the accumulated data recording device. Specifically, the operation status of each blast furnace can be learned from the permeability index calculated from pressure data, the Q statistic calculated from pressure data, the gas utilization ratio calculated from gas analysis values, and the dispersion in the furnace circumferential direction of the Q statistics calculated from the brightness of image data at a plurality of tuyeres in the blast furnace. The operation status of the blast furnace can also be detected from the permeability obtained by dividing the difference between shaft pressure and pressure at the top of the furnace by the volume of the furnace. The gas utilization ratio indicating the component ratio of CO and $CO_2$ obtained by analyzing the gas components obtained from the top of the furnace is another indicator of the operation status of the blast furnace. Focusing on the lower part of the blast furnace, the furnace heat index that reflects the thermal state in the blast furnace based on calculation of the heat balance at the lower part of the blast furnace can be calculated and used to determine the status of reactions in the blast furnace earlier than the molten iron temperature. The operational data sets include other various data from which the operation status of the blast furnace can be learned, and the operation status of the blast furnace can be determined also from the moving average of such data treated as time-series data, the transition of standard deviation from the mean value calculated in advance, and addition and subtraction of multiple data.

The global data server computer 5 calculates an index indicating the operation status of each blast furnace by performing the analysis described above on the operational data sets of each blast furnace. It is preferable that after completion of the analysis, the global data server computer 5 store the index indicating the operation status of each blast furnace together with the operational data sets into the accumulated data recording device. This process at step S4 may be performed by the edge server computer 4, and the edge server computer 4 may incorporate the index indicating the operation status of the blast furnace into the operational data sets. The process at step S4 is then completed, and the facility monitoring process proceeds to the process at step S5.

In the process at step S5, the global data server computer 5 displays the index indicating the operation status of each blast furnace and the operational data sets on a data display unit such as a liquid crystal display device such that temporal changes can be seen. It is preferable that the global data server computer 5 display the index indicating the operation status of each blast furnace and the operational data sets simultaneously so that the index indicating the operation status of each blast furnace and the operational data sets can be compared. In addition, the period for displaying data can be set as desired so that a long-term trend and a short-term trend can be referred to, thereby facilitating understanding of change of the operation status of each blast furnace. This process makes it easier to determine whether the operation status of the blast furnace is satisfactory and also makes it easier to estimate how the operation status of the blast furnace will change in the future. The process at step S5 is then completed, and the facility monitoring process proceeds to the process at step S6.

In the process at step S6, the global data server computer 5 determines whether the operation status of each blast furnace is satisfactory, for example, based on the index indicating the operation status of each blast furnace. In doing so, the global data server computer 5 may also determine where in the blast furnace and what type of abnormality is occurring. Specifically, in a blast furnace, high permeability in the furnace is important for continuous stable operation. However, when the gas flow in the furnace is disturbed for some reason, abnormalities such as hanging, slip, and gas channeling may occur. The "hanging" is a phenomenon in which the raw material does not descend normally and the descent stops. When "hanging" is eliminated, slip occurs, or hot gas injected from the tuyeres at the lower part of the furnace suddenly jets to the upper part of the furnace for some reason. A number of shaft pressure gauges are installed in the furnace body of the blast furnace. The Q statistic obtained by principal component analysis of data from the shaft pressure gauges is an indicator of the degree of deviation from a distribution that the pressure data may have in a normal operation status. An operational abnormality therefore can be determined by setting a threshold for the Q statistic. When it is determined that the operation is abnormal, the direction in which pressure disturbance has occurred can be learned by referring to all of shaft pressure data. Here, in the principal component analysis serving as a prerequisite for calculating the Q statistic, the data is modeled based on data normalized by the mean value and the standard deviation of the data. The determination of the Q statistic is therefore not unique to each facility and abnormality determination can be performed with a scale common to the facilities.

The permeability index is an indicator for determining a ventilation state in the blast furnace. The permeability index is calculated by dividing the difference between the injection pressure of hot air at the tuyeres and the pressure at the top of the furnace by the volume of the furnace. A threshold value is also set for the permeability index so that operational abnormalities can be determined. Furthermore, instead of the injection pressure at the tuyeres, the measurement values from pressure sensors at the upper part of the furnace, the intermediate part, and the lower part of the shaft may be used to analyze different regions including the upper part, the intermediate part, and the lower part, whereby in which part the ventilation abnormality has occurred can be found. However, the production facilities at other production sites often have different specifications. In such a case, if the operation status is evaluated with the same index, it may be difficult to instantaneously determine whether an abnormality is occurring. The indices obtained from the production facilities of the same kind with different specifications are therefore evaluated with the same scale whereby the possibility of erroneous determination can be reduced. In the case of blast furnaces, the blast furnaces vary in volume and shape and the pressure sensors and thermometers also vary in installation position and number. The resultant index and the range of fluctuation therefore may vary among production facilities.

The index obtained from the operational data to determine the operation status of the facility is defined as a first index, and the mean value of the first index obtained in a period in which the facility is presumably normal in the production status in the past is calculated. The first index obtained sequentially is divided by this mean value to yield a second index, whereby the facility statuses of different production facilities of the same kind can be easily compared and abnormalities can be determined instantaneously. The period of data used to calculate the mean value may be a month to a few months, depending on the kind of production facilities. If the atmosphere temperature has some influence, given seasonal variation factors, the mean value of the first index for about a year may be calculated. Such a conversion into the same scale may be performed by statistical normalization, that is, dividing a value obtained by subtracting the mean value from the operational data by the standard deviation. In the present description, such a process is referred to as conversion of indicators and/or operational data into the same scale. The permeability index and the quantities monitored by the pressure sensors and other sensors may be converted into the same scale.

It is preferable that the temperature of molten iron exiting from the blast furnace be constant, but if an abnormality occurs during operation, the temperature of molten iron may drop excessively to prevent molten iron and slag from being discharged from the tap hole. This trouble is called a furnace cooling accident, which takes a long time to recover and causes a production delay, leading to a significant decline in production. In order to prevent such accidents, operational abnormalities can be determined by an index called furnace heat index TQ. The furnace heat index TQ can be calculated by the equation (1) below. Then, a threshold value is set for the furnace heat index TQ in the same manner as the permeability index, and when the furnace heat index TQ falls below the threshold value, it is determined that the operation is abnormal.

$$TQ=(Q1+Q2)-(Q3+Q4+Q5+Q6)+(Q7-Q8-Q9) \quad (1)$$

Here, Q1 is sensible heat of air flow, Q2 is carbon combustion heat at the tuyere, Q3 is heat of air flow moisture decomposition, Q4 is heat of solution loss reaction, Q5 is heat loss, Q6 is heat of PC (pulverized coal) decomposition, Q7 is sensible heat carried in by coke and molten product, Q8 is sensible heat carried out by produced gas, and Q9 is sensible heat carried out by coke. Since the furnace heat index is also affected by structural differences of the furnace body of the blast furnace, the furnace heat index converted into the same scale may be used so that the furnace heat index common to the facilities can be compared in the same manner as the permeability index.

The global data server computer 5 prepares a plurality of such abnormal determination algorithms and sequentially evaluates the operational data sets obtained from the same blast furnace. The global data server computer 5 may extract a period in which the past operating condition undergoes a change similar to a change for a certain period of time under the current operating condition by comparing metadata obtained from the current operation with past metadata including metadata obtained at other production sites, and may determine whether the operation at the production facility is abnormal, based on the operation status of the production facility in the extracted period. Examples of the metadata include operating conditions including burden distribution, air flow rate, enriched oxygen content, pulverized coal flow rate, coke ratio, air flow moisture content, air flow temperature, and air flow pressure, as well as manipulation conditions. Among these pieces of metadata, those that have scales varying among facilities are stored together with data converted into the same scale, so that they can be used for abnormality diagnosis even for different facilities.

The determination of the operation status may involve human intervention. In such a case, an input device is prepared to allow humans to input an operational abnormality when it is determined that the operation is abnormal. Thus, when it is determined that the operation is abnormal, a label indicating the abnormality can be recorded together with a time stamp in synchronization with time-series data. In this case, different labels can be used to record various abnormal conditions. When the load of the abnormality determination process on the global data server computer 5 is heavy, an abnormality determination computer directly connected to the global data server computer 5 may be prepared so that the abnormality determination computer can perform the abnormality determination process. In addition, the global data server computer 5 may construct a learning model trained by, as training data, operational data sets obtained when the operation status of the blast furnace is normal in the process at step S6, where the operational data set is an input value and the determination value of the operation status of the blast furnace is an output value. The global data server computer 5 may determine the operation status of the blast furnace, based on the determination value of the operation status of the blast furnace output by the learning model for input of the current operational data set.

A machine learning model for abnormality diagnosis may be constructed using the abnormality label input by humans, and data obtained by converting the operation indicator (permeability index, furnace heat index, etc.), the operational data, and at least one piece of metadata of the operating conditions at each facility into the same scale, and may be used to determine the operation status of the blast furnace. The operational data unique to each individual facility is standardized by an index indicating the operation and then converted into the same scale, whereby a model can be formed with a huge amount of data using data at all the facilities. In this way, a machine learning model for abnormality determination can be formed with the entire data even if the occurrence frequency is low in each individual facility. The process at step S6 is then completed, and the facility monitoring process proceeds to the process at step S7.

In the process at step S7, the global data server computer 5 gives information on the kind of abnormality that has occurred and the location of the abnormality to the operation operator at the blast furnace that has been determined to have an operational abnormality. For example, abnormalities determined by the Q statistic and permeability are suspected to be attributable to raw material properties, and abnormalities detected by the furnace heat index are suspected to be caused by failure in slag drainage. Upon notification of an abnormality in the operation status of the blast furnace, the operation operator immediately moves to actions for recovery. As an example of means of communicating the abnormality to the operation operator, a screen indicating abnormality information may be prepared on a dedicated personal computer, a tablet terminal, or the like connected to the same telecommunication network and the abnormality information may show up on the screen. Alternatively, the notification may be sent by email to a mobile phone or a smartphone owned by the operation operator.

The global data server computer 5 may notify the operation operator at each blast furnace of the determination as to whether the operation status is kept in a good state or is being deteriorated. The operation operator at a production site different from the production site with the abnormality may take action to cope with the abnormality at the production site with the abnormality. Furthermore, the action and the amount of manipulation for the blast furnace in the case of abnormalities may be set in advance so that actions can be taken automatically.

If an abnormality occurs, the same kind of abnormality may occur at other production sites having the same production facilities. When the same raw materials are used at different production sites, a similar abnormality may occur at a plurality of production sites. It is therefore preferable that abnormality information be given not only to the production site with the abnormality but also to the operation operators at other production sites as a caution. Such a process enables the operation operators or persons in charge of facilities at other production sites to determine in advance whether a similar abnormality will occur, and to take some action before a serious trouble occurs. The process at step S7 is then completed, and the facility monitoring process ends.

Although the embodiment to which aspects of the invention made by the inventors are applied has been described above, the present invention is not intended to be limited by the description and the drawings that form part of the disclosure according to the present embodiment. In other words, all of the other embodiments, examples, and operation techniques carried out by those skilled in the art based on the present embodiment are embraced in the scope of aspects of the present invention.

INDUSTRIAL APPLICABILITY

Aspects of the present invention provide a production facilities monitoring method, a production facilities monitoring device, and an operation method for production facilities that accurately detect operational abnormalities in production facilities without requiring a large amount of manpower and enable prompt action for operational abnormalities.

REFERENCE SIGNS LIST 1 production facilities monitoring system
2 blast furnace sensor
3 process computer
4 edge server computer
5 global data server computer

The invention claimed is:

1. A production facilities monitoring method for monitoring an operation status of a plurality of production facilities of a same kind located at a plurality of production sites, the production facilities monitoring method comprising:
   a data information preparation step of aggregating operational data of each of the production facilities for each of the production sites;
   a data accumulation step of accumulating the operational data aggregated at the data information preparation step into a computer located at a data accumulation site;
   a data analysis step of analyzing a current operation status at each of the production facilities, using current operational data and past operational data accumulated at the data accumulation step; and
   an operation status determination step of determining whether operation is abnormal at each of the production facilities, based on an analysis result of the data analysis step.

2. The production facilities monitoring method according to claim 1, wherein number of items, item names and units of the operational data are common among the production facilities.

3. The production facilities monitoring method according to claim 1, wherein the operation status determination step includes a step of determining whether the operation is abnormal in each of the production facilities, based on an index derived from the operational data at the data analysis step.

4. The production facilities monitoring method according to claim 1, wherein
   the data information preparation step includes a step of aggregating metadata including at least operating condition data of each of the production facilities at a time when the operational data is obtained,
   the data accumulation step includes a step of accumulating metadata aggregated at the data information preparation step into the computer, the data analysis step includes a step of extracting a period in which a past operating condition undergoes a change similar to a change for a predetermined period of time under a current operating condition by comparing metadata obtained from current operation with past metadata including metadata obtained at other production facilities, and the operation status determination step includes a step of determining whether the operation at each of the production facilities is abnormal by comparing the current operational data in the period extracted at the data analysis step with the past operational data.

5. The production facilities monitoring method according to claim 1, wherein the operation status determination step includes a step of determining whether the operation is abnormal, using an operation indicator, operational data and at least one pieces of metadata of operating conditions converted into a same scale.

6. The production facilities monitoring method according to claim 1, further comprising a step of displaying aggregated operational data and an analysis result of the operational data.

7. A production facilities monitoring device for monitoring an operation status of a plurality of production facilities of a same kind located at a plurality of production sites, the production facilities monitoring device comprising:
   a data information preparation unit configured to aggregate operational data of each of the production facilities for each of the production sites;
   a data accumulation unit configured to accumulate the operational data aggregated by the data information preparation unit;
   a data analysis unit configured to analyze a current operation status at each of the production facilities, using current operational data and past operational data accumulated by the data accumulation unit; and
   an operation status determination unit configured to determine whether the operation is abnormal at each of the production facilities, based on an analysis result by the data analysis unit.

8. An operation method for production facilities using the production facilities monitoring method according to claim 1, the operation method comprising
   a step of operating a production facility based on a determination result at the operation status determination step.

9. The production facilities monitoring method according to claim 1, wherein the operation status determination step includes a step of determining whether the operation is abnormal in each of the production facilities, based on operation indicators derived from the operational data at the data analysis step, the operation indicators having been converted into a same scale to enable comparison of facility statuses of the plurality of production facilities of the same kind with different specifications.

10. The production facilities monitoring device according to claim 7, wherein the operation status determination unit is configured to determine whether the operation is abnormal in each of the production facilities, based on operation indicators derived from the operational data by the data analysis unit, the operation indicators having been converted into a same scale to enable comparison of facility statuses of the plurality of production facilities of the same kind with different specifications.

* * * * *